United States Patent [19]

Laudick

[11] 4,004,377
[45] Jan. 25, 1977

[54] MACHINE FOR FORMING A LOCATOR PIN

[76] Inventor: Richard D. Laudick, 314 E. Lyon, Lyons, Kans. 67554

[22] Filed: June 9, 1975

[21] Appl. No.: 585,086

Related U.S. Application Data

[62] Division of Ser. No. 467,464, May 6, 1974, Pat. No. 3,918,694.

[52] U.S. Cl. .............................. 51/232; 51/97 NC; 51/225
[51] Int. Cl.² ........................................ B24B 47/10
[58] Field of Search .............. 51/219 PC, 225, 232, 51/97 NC, 101 R

[56] References Cited

UNITED STATES PATENTS

| | | | |
|---|---|---|---|
| 1,323,452 | 12/1919 | Cogsdill .......................... | 51/219 PC |
| 1,994,975 | 3/1935 | Williams .......................... | 51/219 PC |
| 2,019,039 | 10/1935 | Balsiger ........................... | 51/101 R |
| 2,471,539 | 5/1949 | Parker .................................. | 51/232 |
| 2,542,507 | 2/1951 | Glaser ........................ | 51/101 R UX |

Primary Examiner—Harold D. Whitehead
Attorney, Agent, or Firm—John H. Widdowson; Edwin H. Crabtree

[57] ABSTRACT

A machine for forming the head end portion of a locator pin has a base rigidly mountable. A housing is transversely movably mounted on the base. A pin mounting is on the housing. The machine in use rotates the pin mount simultaneously with moving the housing transversely on the base, so the head end portion of the pin can be ground to have a cylindrical form oblong in cross section with the ends of the cross section being arcuate.

1 Claim, 11 Drawing Figures

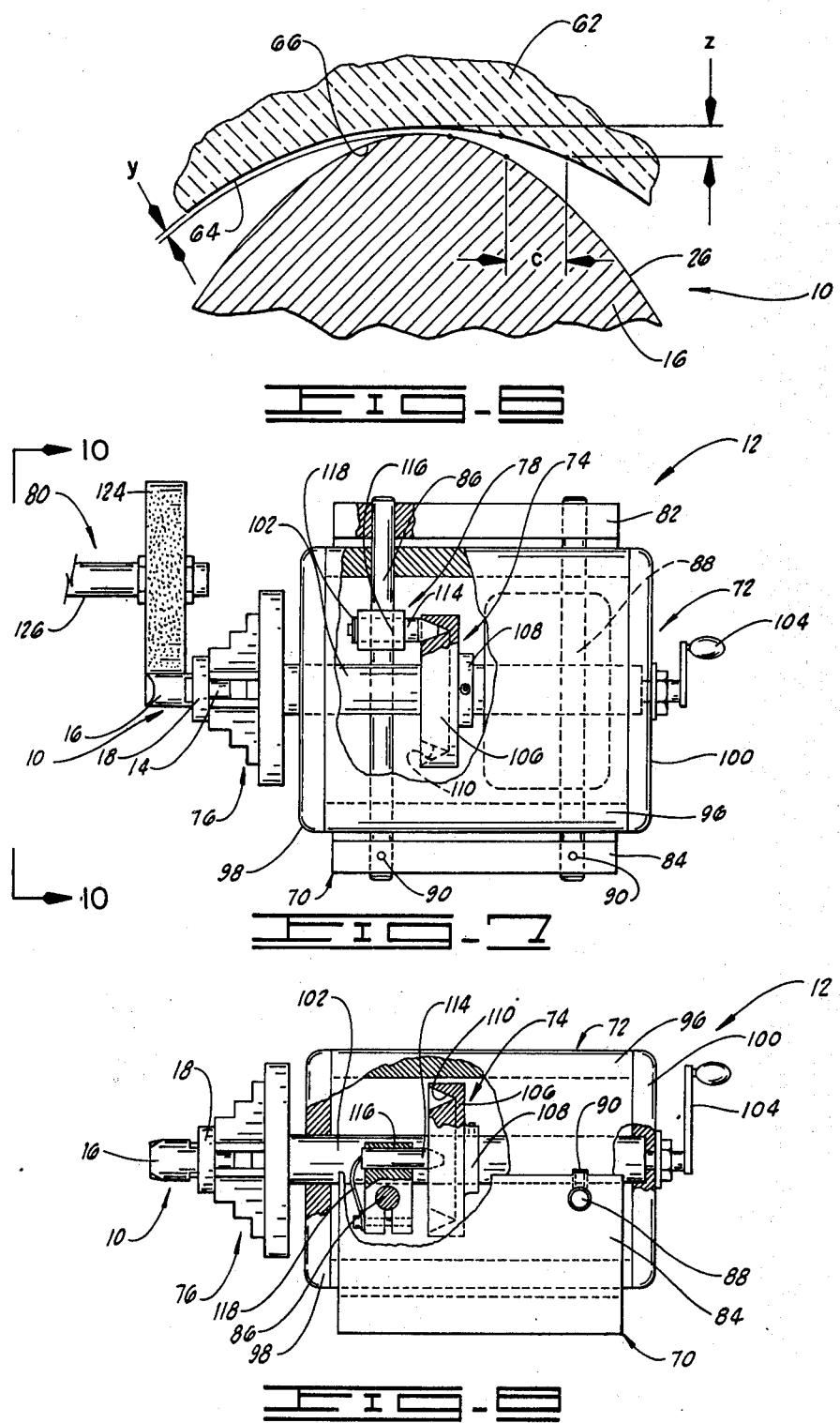

MACHINE FOR FORMING A LOCATOR PIN

This is a division of application Ser. No. 467,464, filed May 6, 1974, now U.S. Pat. No. 3,918,694, issued Nov. 11, 1975.

BACKGROUND OF THE INVENTION

Numerous types of locating pins are known in the prior art as operable to support or locate a part on a machine or position a workpiece on a tooling jig. The prior art locating pins are of "round" and "relieved" configuration. They are used together mounted on a fixture a distance apart corresponding to a distance between two apertures on a workpiece. When a workpiece is placed on the two locator pins the round one provides restraint in all directions and the relieved locator is so designed to provide transverse restraint only. One commonly used prior art relieved locator pin is commonly referred to as a diamond locator, because of its essentially diamond-shaped cross section. In use, the diamond-shaped locator pin damages holes of parts by gouging the interior sides of the hole, if the part has a significant interference fit with the locator pin. In an effort to prevent gouging by diamond locator pins, the pin is reduced in dimension, which in turn, undesirably reduces the transverse restraint the diamond pin provides and adversely affects workpiece dimension tolerances. Another problem with prior art locator pins is pin breakage due to interference. Locator pins are usually broken when a workpiece is forced onto the locator pins, at which time the pin is broken, and the part is most probably gouged or scratched by the pin as it breaks. Locator pins other than the conventional diamond locator pin, are subject to the same problems in regard to gouging and pin breakage. No prior art relieved locator pins are known which provide little longitudinal restraint while retaining the ability to provide substantial transverse restraint without having the disadvantages of having a sharp portion which is likely to gouge a workpiece or being a pin which is easily broken.

SUMMARY OF THE INVENTION

In one preferred specific embodiment, the locator pin structure includes a mounting end portion and a head end portion, wherein the head end portion is of cylindrical form with an oblong cross section with the ends of the cross section being arcuate wherein the locator pin can be used as the second tooling pin on a tooling jig or as a locator pin on a machine or the like. A machine is provided to grind the head end portion of a pin so that it will have the described cross section. The machine has a base rigidly mountable on a supporting structure with a housing translatably movably mounted on the base, with the means to move the housing transversely back and forth across the base, and a pin mount is supported on the means to move the housing. The machine is used with a suitable grinder to shape the head end portion of the locator pin. As the pin mount is rotated to rotate the pin the housing is moved simultaneously back and forth transversely on the base thereby rotating and translating the pin supported in the mount for grinding the exterior surface of its head end portion to a specified cross sectional shape.

One object of this invention is to provide a machine for making a relieved locator pin structure overcoming the aforementioned disadvantages of the prior art devices.

Yet, another object of this invention is to provide a machine usable for grinding relieved locator pins or for grinding other members to have an essentially elliptical or other than circular cross section, wherein the machine has a base that is rigidly mountable on a supporting surface and a housing translatably movably mounted on the base, with a mount on the housing which rotates simultaneously with oscillating transverse movement of the housing on the base to move a workpiece so its shaped surface can be ground by a grinder or the like.

Various other objects, advantages, and features of the invention will become apparent to those skilled in the art from the following discussion, taken in conjunction with the accompanying drawings, in which:

DESCRIPTION OF THE DRAWINGS

FIG. 6 is an enlarged sectional view of the contact portions of a workpiece and the locator pin of this invention;

FIG. 7 is a top plan view of the locator pin grinding machine with portions thereof cut away for clarity, and showing a locator pin in the chuck and a grinding wheel;

FIG. 8 is a side elevation view of the locator pin grinding machine shown in FIG. 7 with portions thereof cut away for clarity;

Figure 1:
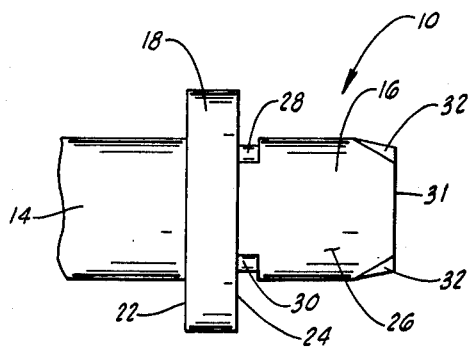
FIG. 1 is a side elevation view of the locator pin, with the view taken parallel to the major axis of the head end portion thereof.

The following is a discussion and description of preferred specific embodiments of the locator pin and machine for forming the head end of same of this invention, such being made with reference to the drawings, whereupon the same reference numerals are used to indicate the same or similar parts and/or structure. It is to be understood that such discussion and description is not to unduly limit the scope of the invention.

DESCRIPTION OF PREFERRED EMBODIMENTS

Figure 2:
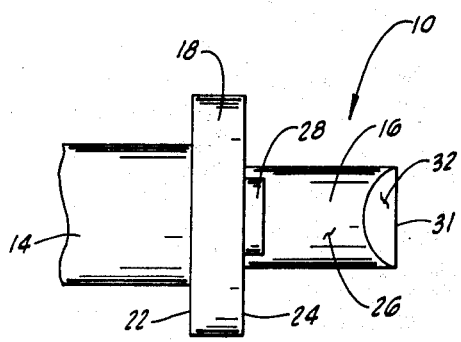
FIG. 2 is a side elevation view of the locator pin, the view taken parallel to the minor axis of the head end portion thereof.
Figure 3:
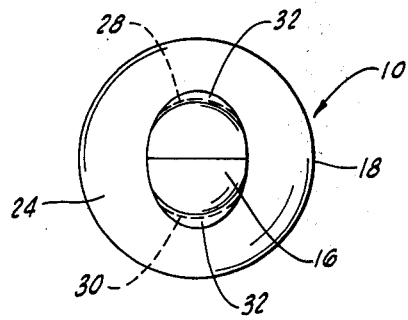
FIG. 3 is an end elevation view of the locator pin, taken from the head end portion thereof.
Figure 4:
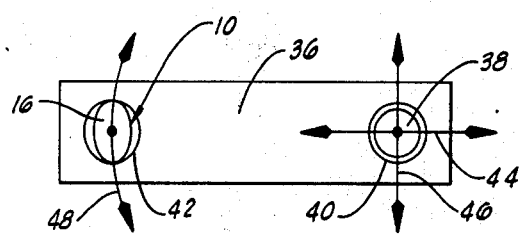
FIG. 4 is a plan view of a workpiece having two holes, with a circular principal locator pin showing in one end hole thereof and a second locator pin of this invention in the hole on the opposite end thereof, with arrows indicating transverse and longitudinal directions of restraint.
Figure 5:
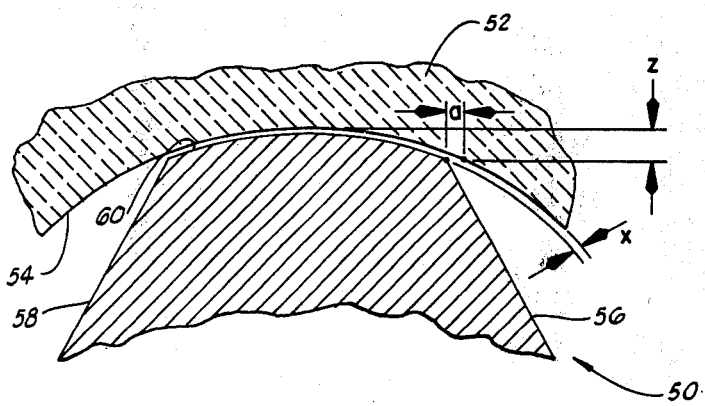
FIG. 5 is an enlarged sectional view of the contact portions of cross sectionally diamond shaped relieved locator pin and a workpiece.

In referring to the drawings in detail, and in particular to FIGS. 1, 2, and 3, such shows the locator pin of this invention alone and generally indicated at 10. FIGS. 4, 5, and 6 show the locator pin 10 of this invention in use with a workpiece and in comparison to a conventional diamond locator pin. FIGS. 7–11 show the machine for making the locator pin of this invention with the machine indicated generally at 12. The machine for forming the head end of the pin supports the pin and moves such in a patterned motion so the exterior surface of the pin can be cut away by a grinder.

The preferred structure of the locator pin 10 is shown in detail in FIGS. 1, 2, and 3, and includes a mount end portion 14, a head end portion 16, and a flange portion 18 in the center portion of the pin. The pin's mount end portion 14, and head end portion 16 are together elongated and generally in alignment. The flange portion 18 extends radially from the juncture of the mount end portion 14 and the head end portion 16. It is to be understood that the flange portion 18 is not an essential element of the locator pin of this invention and the locator pin can be constructed without it and not depart from the scope of the invention. Generally locator pins used as tooling pins are provided with the flange portion to provide clearance between the workpiece and the tooling jig. The mount end portion 14, the flange portion 18, and the head end portion 16 are preferably constructed from the same piece of material. The mount end portion 14 is cylindrical in shape and elongated. The free end portion of the mount end portion 14 can be threaded or sized to provide interference fit or otherwise shaped as necessary to be mounted with or secured to a tooling jig or other supporting structure. The flange portion 18 is a circularly shaped portion of the pin structure as shown, which in use contacts the surface of the tooling jig to position the locator pin vertically in the jig and provide a rest area for the workpiece. The flange portion 18 has a lower side 22, which in use contacts the surface of the tooling jig, and it has an upper side 24, which in use can contact the workpiece. The locator pin head end portion 16 is of a cylinder form having an essentially elongated or oblong transverse cross section substantially throughout its length with the ends of the cross section being arcuate. The pin can have curved sides as shown in FIGS. 1–3 or the sides can be straight or a combination thereof. Preferably, the locator pin's head end portion is essentially elliptical in cross section. The major portion of the locator pin's head end portion is cross sectionally essentially elliptical and this portion lies between the attached end portion joining the flanged portion 18 or the mounting end portion 14 if the flange is not present and the free end 31 which in use receives the workpiece. The circumferential surface of the major portion of the pin's head end portion is indicated at 26 and such is preferably ground to be essentially smooth. Relief portions 28 and 30 may be formed in the locator pin's head end portion 16 immediately adjacent to the flange portion 18 if desired or they may be omitted. These relief portions 28 and 30 are shown in FIGS. 1 and 2, and in dashed lines in FIG. 3. The relief portions 28 and 30 are essentially a circular portion that can be formed by circularly grinding the locator pin immediately adjacent to the flange portion 18. The locator pin's free end portion is preferably champhered with the surface thereof indicated at 32.

The champhered surface 32 is preferably circularly ground, relative to the axis of the mount end portion 14 and having the innermost diameter thereof being the same as the minor axis of the locator pin's elliptical cross section and inclined radially at 45°. In practice in making the locator pin of this invention this champhered surface 32 has been formed by grinding prior to grinding the exterior surface 26 of the locator pin.

FIG. 4 illustrates the locator pin 10 used as the second or relieved locator pin in a tooling jig with a workpiece 36 and a principal or round locator pin 38. The principal locator pin 38 is a locator pin and has a circular transverse cross section to provide longitudinal and transverse restraints for the workpiece 36. The workpiece 36 has a principal locator aperture 40 on one end which is mounted on the principal locator pin 38 and a second aperture 42 on the opposite end which is mounted on the second locator pin or here, the locator pin 10. At the principal locator pin the arrows indicated at 44 indicate restraint in the longitudinal direction and the arrows indicated at 46 indicate restraint in the transverse direction. The arrows indicated at 48 on the second or relieved locator pin indicate restraint in the transverse direction. The principal locator pin ideally supplies restraint in the longitudinal and transverse directions while the second locator pin provides restraint in the transverse direction only, as indicated by the arrows. Both the principal locator pin and the second locator pin should provide as much restraint in the transverse direction as is practical for a particular situation, depending upon the tolerance desired or required for a particular workpiece. Ideally, the second or relieved locator pin should provide as little longitudinal restraint as possible and still have substantial bearing or wear areas of contact with the workpiece.

FIG. 5 shows a portion of a workpiece and a conventional diamond locator pin in an enlarged view with the diamond locator pin indicated generally at 50 and the workpiece at 52. As described above, the diamond locator pin 50 is a conventional pin popularly in use in tooling applications. The workpiece 52 is provided with a hole therein having a circular interior surface 54. The diamond locator pin 50 has converging sides 56 and 58, with a partially circularly-shaped outer portion 60 which in use is positioned adjacent to the hole's surface 54. The bearing or wear area of the diamond locator pin is the partially circularly-shaped end portions and this is the portion of the pin which is subjected to wear as it rubs on a workpiece. FIG. 5 shows the locator pin 50 and workpiece 52 in position with the locator pin properly aligned in the hole. The space generally provided between the locator pin and the hole surface 54 is indicated by the dimension labeled X. The transverse restraint of the workpiece 52 relative to the diamond locator pin 50 is governed by the dimension X. Restraint in the longitudinal direction between the workpiece 52 and the diamond locator pin 50 depends upon the dimension $a$ which is the distance between the corner of the locator pin and the wall of the hole. The dimension labeled $a$ allows variation in the longitudinal dimension between the hole of the part shown, and another hole in the part positioned elsewhere by the principal locator. If the dimension between the principal locator hole and the hole shown in FIG. 5 vary by more than or less than the dimension $a$, then interference exists and the corner of the locator pin 50 will gouge into the surface 54 of the hole in the workpiece; and in extreme cases, cause the hole to be severely damaged and the locator pin 50 to be broken if the workpiece 52 is forced onto pins of the jig.

FIG. 6 shows in enlarged detail, the portion of the locator pin 10 and a portion of a workpiece 62. The workpiece as shown has an aperture or hole with a cross sectionally circular inner surface 64. The locator pin head end portion 16 is shown adjacent to the circular surface 64 of the hole in the workpiece. The dimension labeled Y indicates spacing between the hole's surface 64, and the pin's head end portion 16. As shown, the most sharply arcuate portion of the locator pin 10 is indicated at 66, adjacent to the surface 64. Preferably, the locator pin is aligned with the workpiece's position in the jig, so that a line on the major axis of the pin's elliptical cross section is in the transverse direction; that is perpendicular to a line drawn between the centers of the principal and secondary locator pins. The dimension labeled $c$ is the distance between the surface of the locator pin's exterior surface 26 and the hole surface 64 at a point a certain distance Z from the intersection of the hole's surface 64 and aligned through the major axis of the locator pin's head end portion 16. Motion of the workpiece 62 relative to the locator pin 10 in the transverse direction was limited by the dimension Y, for the position of the workpiece and the locator pin as shown in FIG. 6. Longitudinal variation in the positioning of the locator pin 10 and the workpiece 62 changes the relative positions of the pin and the workpiece, and thus the spacing therebetween, dimension $c$.

In comparing FIGS. 5 and 6, the advantages of the locator pin of this invention become obvious. In both figures, the workpieces 62 and 52 are drawn with the holes therein being the same size and the locator pins having the same transverse dimensions. The dimension labeled Z in both figures is drawn the same for illustration purposes. In comparing FIGS. 5 and 6 and particular dimensions $a$ and $c$, it is obvious that the locator pin 10 will provide greater variation in the longitudinal direction while providing the substantially same restraint in the transverse direction, as compared with the diamond-shaped locator pin 50. In comparing longitudinal motion between FIGS. 5 and 6, it is obvious that with the locator pin 10, there can be a greater longitudinal difference between the locator pins and the holes in the workpiece than there can be for the same situation using the diamond locator pin 50, while the transverse restraint is the same. As a practical matter, this longitudinal allowance will prevent the locator pin from gouging the workpiece or from being broken. Also, it will permit a wider range of variation in the location of the holes in the part or workpiece, reducing costs inherent in holding close tolerances in the workpiece. In other words, when comparing FIG. 5 and FIG. 6 for the case where dimensions X and Y are the same, the locator pin 10 of this invention will provide a greater allowance for movement or variation in the longitudinal direction than possible with the diamond locator pin and the same allowance for movement or variation in the transverse direction because of the shape of its head end portion 16. This greater longitudinal allowance for movement or variation permits increased flexibility in positioning the relieved locator pins to maintain a specific tolerance of a workpiece because the more exacting positioning requirements of the diamond locator are not required. For example, in practice a tooling jig was set up with one round or principal locator pin and one relieved or second locator pin to mount a workpiece having a hole spacing of 2.00 inches ± 0.035 inches. The locator pins were set 2.00 inches apart. With a diamond locator pin in the jig it would accept a part with up to 2.010 inches hole spacing without substantial interference, it would accept a part of 2.013 inches hole spacing with significant interference on the sharp corners of the pin, and it would not accept a part of 2.015 or greater hole spacing. With the locator pin of this invention, having the same transverse dimension as the diamond locator pin in the jig, it would accept a part up to 2.025 hole spacing without significant interference. From this example it is obvious that for the same transverse restraint the locator pin of this invention provides a greater longitudinal allowance for movement than a conventional relieved locator pin.

The machine for forming head ends of the locator pin of this invention is indicated generally at 12 and is shown in FIGS. 7–11 on Sheets 2 and 3 of the drawings. The machine includes a base portion 70, which is mounted on a supporting structure with a housing 72 translatably movably mounted on the base. A shaft supported cam assembly 74 is mounted in the housing with a locator pin mounting chuck assembly 76 attached on the end of the shaft and the exterior of the housing 72. The shaft and cam assembly 74 has a cam follower indicated generally at 78, which causes the housing 72 to translate back and forth on the base 70 simultaneously as the shaft and cam assembly 74 including the locator pin mounting chuck assembly 76 is rotated. The machine 12 is used in conjunction with a grinder indicated generally at 80 to grind a locator pin 10 with the locator pin mounted in the chuck assembly 76.

The machine's base portion 70 is a rigid structure having a bottom portion 80 and upright sides 82 and 84 along opposite sides of the bottom portion 80. A pair of cylindrically-shaped rail members 86 and 88 extend transversely through the housing 72 with the ends thereof mounted in the sides 82 and 84 of the base as shown. The rails 86 and 88 are mounted with the base 70 in a parallel spaced relation, and they are preferably removably mounted by set screws or the like 90. When the machine 12 is to be used, the base 70 is secured to a supporting structure such as the platform indicated generally at 92, and shown in FIG. 10. In use the base 70 can be attached to the supporting structure or platform 92 by bolts or other suitable fasteners.

Figure 9:
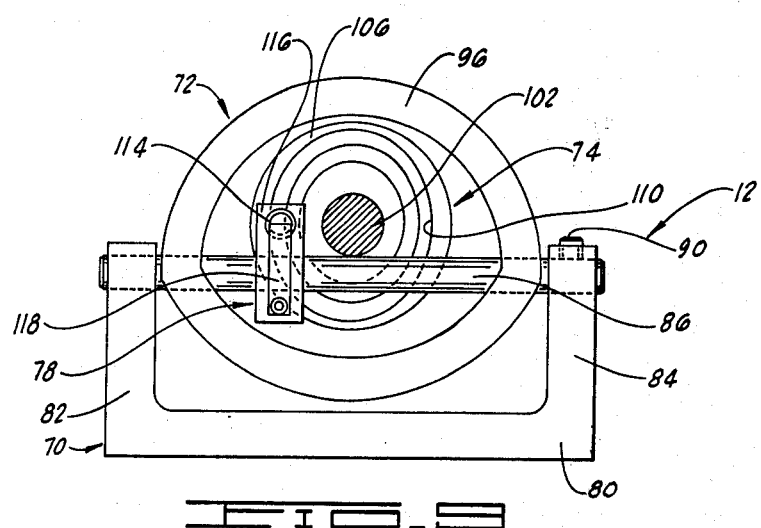
FIG. 9 is an elevation view of the workpiece end of the locator pin grinding machine alone with the end cover and locator pin mounting chuck removed exposing the interior of the housing.

The machine's housing 72 encloses the cam and shaft assembly 74 and the cam follower 78, and it is mounted on the rails 86 and 88. The housing has a center portion 96 which is hollow, as shown, it is provided with transversely positioned apertures for mounting the rails 86 and 88, and it has cover members 98 and 100 on the ends thereof. The housing ends 98 and 100 are securable to the housing's center portion 96 by screws or other suitable fasteners so they are rigidly attached. The apertures through the housing's center portion 96 serve as bearings to support the housing 72 on the rails 86 and 88. A shaft 102 is rotatably mounted in the housing ends 98 and 100. The chuck 76 is mounted on one end of the shaft 102, and a crank assembly 104 is mounted on the opposite end of the shaft 102 to rotate same. The cam is indicated specifically at 106 and it is rigidly mounted on the shaft 102. The cam 106 is a disc-like member having a collar portion 108 fitted with a set screw for securing it to the shaft and a groove 110 in the peripheral portion of one side of its disc portion to receive the cam follower assembly 78. The cam follower assembly has a cam follower pin 114 mounted in a support block 116. The support block 116 is rigidly attached to rail member 86. The cam follower pin 114 is movably mounted in an aperture in the support block 116 and retained in position therein with the point thereof in the cam groove 110 by a leaf spring 118. The cam follower mounting block 116 is split on its lower portion like a clamp as shown in FIG. 8, with the separate portions thereof joined by a retainer fastener to compressibly clamp the lower portion of the block on the rail 86. The leaf spring 118 is attached by the fastener on the lower portion of the cam follower mounting block 116, and its free end presses against one end of the cam follower 114 resiliently urging it into the cam groove 110. The cam groove 110 is generally centered relative to the longitudinal axis of the shaft 102, and is preferably elliptically-shaped as shown in FIG. 9. The cam groove 110 is preferably cross-sectionally V-shaped as shown, to receive the pointed end portion of the cam follower 114. When the shaft 102 is rotated, the cam 106 rotates with it, and the cam follower 114 slides in the cam groove 110, and the housing 72 is moved on the rails 86 and 88 in an oscillating movement translating back and forth relative to the base 70. The cam follower 114 remains stationary, relative to the base 70, because it is secured to rail 86 which is secured to the base. The cam and shaft assembly 74 move with the housing 72 and control its position, depending upon the rotational position of the cam 106 relative to the cam follower assembly 78. The locator pin mounting chuck 76 is preferably a multiple jaw-type chuck assembly which can be threadedly mounted or otherwise mounted on the end of the shaft 102. The chuck 76 secures the mount end portion 14 of the locator pin 10 when the locator pin is being ground. The chuck assembly 76 as shown in the drawings, is the exposed jaw type; however, it is to be understood that any chuck assembly can be used which will support a locator pin or the like in a position axially aligning with the shaft 102 so it can be ground to a desired shape.

The locator pin grinding machine 12 is preferably constructed with the housing 72 being an enclosed structure to guard the moving parts of the machine, covering them for operator safety and protecting them from external damage. It is to be understood that the housing can be substituted by a suitable shaft support assembly, which would mount the shaft and cam assembly 74 on the rails of the base. In the drawings, the handcrank assembly 104 is shown to illustrate one means for rotating the shaft and cam assembly 74 to operate the machine; however, it is to be understood that this can be replaced by a powered or motorized rotating mechanism if desired. Further, it is to be noted that the cam member 106 is by itself removable from the shaft 102, by disassembling the machine. The removable cam feature of the machine 12 provides for interchanging of cams which will enable a single machine to be used to produce a number of different shapes of locator pins or other articles.

Figure 10:
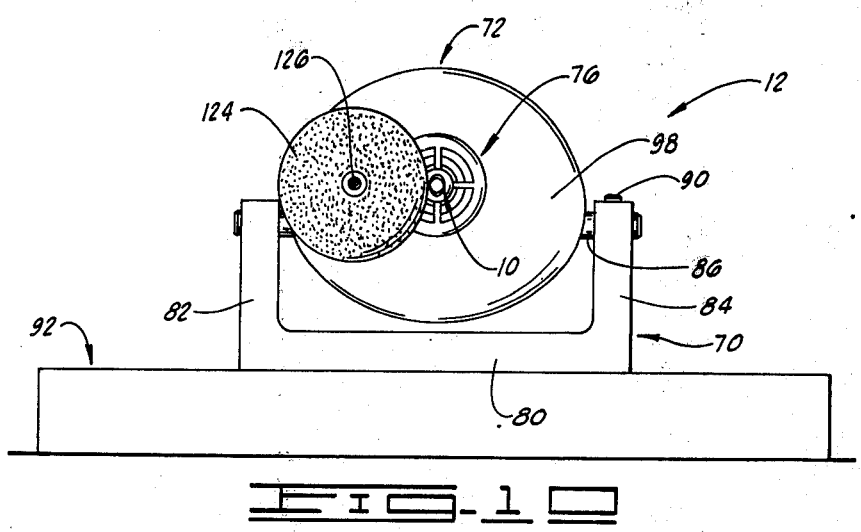
FIG. 10 is a side elevation view of the locator pin grinding machine and grinder wheel shown in FIG. 7, the view taken on line 10—10 in FIG. 7.
Figure 11:
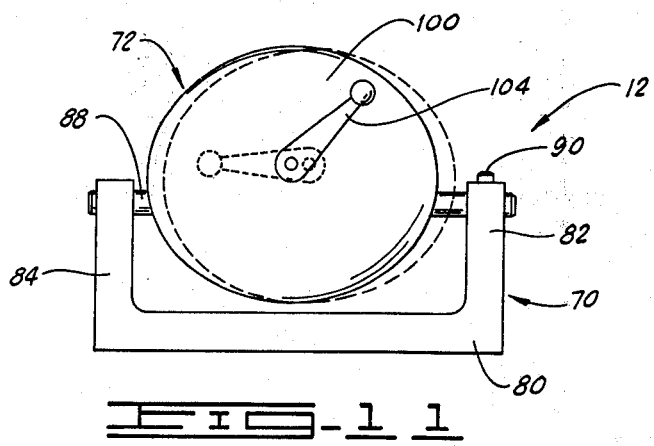
FIG. 11 is an end elevation view of the locator pin grinding machine, taken from the end opposite that of FIG. 10 showing the crank displaced in dashed lines, and the housing displaced in dashed lines, illustrating the translating movement of the housing.

In the use and operation of the locator pin grinding machine 12 of this invention, the base 70 is mounted on a secure supporting structure, as shown in FIG. 10, and a grinder is positioned so that it will contact a locator pin when placed in the chuck assembly 76 as shown in FIG. 7. The grinder 80, shown in FIG. 7, has a circular grinding wheel 124 mounted on a powered rotatable shaft 126. When a circular abrasive wheel grinder is used as shown in the drawings, it is preferably placed with its axis of rotation horizontally aligned with the plane of motion of the shaft 102, which will be the horizontal plane of motion of the locator pin being ground. It is to be understood that grinders other than circular wheel abrasive grinders can be used with the machine 12 of this invention for grinding locator pins. When the grinder is properly positioned and operable, a locator pin blank which has a cylindrically-shaped head end portion is mounted in the chuck assembly 78, then the grinder is started to begin cutting. Rotation of the shaft 102 by the end crank assembly 104 rotates the shaft and simultaneously translates the chuck assembly and locator pin horizontally to bring different portions of the perimeter of the locator pin blank into contact with the abrasive surface of the grinding wheel 124. Depending upon the particular grinding apparatus and support structure, it is desirable to mount the grinder or the machine base portion 70 on a movable bed so the locator pin blank can be eased into contact with the abrasive surface of the grinder prior to rotation and translation of the locator pin by the machine 12 in order to prevent damage to the machinery and to provide a smoother, more regulated cutting or grinding action. When the machine 12 is making a final cut on the locator pin, one complete rotation of the shaft and cam assembly 74 will pass all surfaces of the locator pin by the abrasive surface of the grinder. It is to be noted that although the machine 12 of this invention is described for use in grinding the head end portion of a locator pin, it is to be understood that same can be used for grinding objects other than locator pins, by simply mounting them in the chuck assembly 76. One example of an object other than a locator pin which can be ground with the machine 12 of this invention is the end of a shaft.

In the manufacture of the locator pin and the machine for grinding the head end of same of this invention, it is obvious that the pin can be easily produced by using the described machine or by other suitable apparatus; and it is obvious that the machine of this invention can be easily constructed for use with a grinder or the like for use in making the locator pin or for grinding other objects. The locator pin of this invention can be manufactured by processes currently used in the art for the manufacture of locator pins, although it is preferably manufactured by using a machine of this invention. The machine of this invention is simple in construction, therefore easily manufactured and easily used with grinders and grinding workpiece support structures of a conventional machine shop character.

In the use and operation of the locator pin of this invention, it is seen through the description above and comparison with existing locator pins, that same provides a locator pin which will improve the quality of articles produced using tooling jigs as well as their speed of manufacture. The locator pin, due to its elliptical cross section, does not sacrifice transverse restraint, while allowing maximum variation between workpieces. Also, the pin's curved exterior will not damage workpieces easily as do prior art locator pins, specifically the diamond locator pins; also it is provided with adequate wear areas on contact areas to give it a substantially long useful life. The locator pin of this invention will improve the speed of a manufacturing process because it will not normally break which requires time and expense for replacement and it will not normally gouge or disfigure workpieces which produce waste. In the use and operation of the machine of this invention, it is seen that same provides a simple machine which will precisely grind a cylinder of elongated annular or elliptical cross section on the head end portion of a locator pin or on other articles.

As will become apparent from the foregoing description of the applicant's locator pin and machine for forming the head end of same, relatively simple means have been provided to improve the quality of locator pins through the structure of a new and novel locator pin, and to improve the manufacture of locator pins by providing a machine for forming the head end of them. The locator pin structure is economical to manufacture in that it can be inexpensively produced by using conventional round locator pins or locator pin blanks or bar stock. The locator pin is simple to use in that it is used as non-principal locator pins or second locator pins in a tooling jig and usable for locating parts on a machine or the like. The machine of this invention is simple to use and may be operated economically to produce locator pins having a cylinder form head end portion of an essentially elliptical cross section. The machine can be used with circular wheel abrasive grinders or other grinding equipment in forming the locator pins. It is to be noted that the machine of this invention can be used for grinding objects other than locator pins.

I claim:

1. A machine for making a locator pin or the like, the machine comprising:
   a base rigidly mounted;
   a pair of parallel rails mounted on said base;
   a cam follower rigidly secured to one of said rails;
   an elongated housing having ends, and movably mounted on said rails, the movement of said housing transverse to the length of said housing;
   a shaft rotatably mounted in said housing and parallel to the length of said housing;
   a cam mounted on said shaft, said cam having a grooved portion therein, said cam follower slidably engaged in the grooved portion of said cam;
   a chuck secured to one end of said shaft for engaging the locator pin and rotating the pin thereon; and
   a crank or the like attached to the other end of said shaft for rotating said shaft;
   said base is an elongated U-shaped base having a bottom portion and two side portions, said parallel rails mounted at the ends thereof to the side portions of said base, said rails suspending said housing between the side portions of said base, the length of said housing parallel to the side portions of said base, the ends of said housing extending outwardly from the side portions of said base, said housing encloses said cam, said cam follower, and a portion of said shaft, said grooved portion of said cam is generally annular and eliptically elongated, said cam follower includes a cam follower pin, a support block, and a leaf spring, said cam follower pin movably mounted in said support block, said support block rigidly secured to one of said rails, said cam follower pin resiliently urged into the grooved portion of said cam by one end of said leaf spring, the other end of said leaf spring attached to said support block,
   said machine for making a locator pin and constructed and adapted to in use to be used with a grinder or the like to grind the head end portion of the locator pin or the like to an annular transverse cross section.

* * * * *